United States Patent [19]

Fass

[11] 4,058,322
[45] Nov. 15, 1977

[54] BEARING SEAL FOR ENDLESS TRACKS

[75] Inventor: Carl Fass, Ennepetal-Voerde, Germany

[73] Assignee: Intertrac Viehmann & Co., Gevelsberg, Germany

[21] Appl. No.: 691,444

[22] Filed: June 1, 1976

[30] Foreign Application Priority Data

June 12, 1975 Germany .............................. 2526327

[51] Int. Cl.² .............................................. F16J 15/34
[52] U.S. Cl. .................................. 277/96.1; 277/206 A
[58] Field of Search ..................... 277/96.1, 92, 95, 82, 277/206.1

[56] References Cited

U.S. PATENT DOCUMENTS

| 3,183,008 | 5/1965 | Yost | 277/206.1 |
| 3,390,922 | 7/1968 | Reinsma | 277/95 |
| 3,560,059 | 2/1971 | Miyake | 277/92 |

FOREIGN PATENT DOCUMENTS 1,102,556  2/1968  United Kingdom ............ 277/206 A Primary Examiner—Robert I. Smith
Attorney, Agent, or Firm—Spencer & Kaye

[57] ABSTRACT

A seal for endless tracks formed of alternating first and second link sides articulated to one another at joints; each joint including a bushing affixed to the first link side and a pin surrounded by the bushing and affixed to the second link side and an annular recess provided in the second link side and surrounding the pin. The seal is formed by a resilient sealing ring received in the recess and surrounding the pin. The sealing ring has a first radial side and a second radial side and is axially compressed by a radial edge face of the bushing and a radial base of the recess. As a result, the first radial side is in engagement with the radial edge face of the bushing and the second radial side is in engagement with the radial base of the recess. The first radial side is concave and defines with the radial edge face of the bushing a sealed chamber. The outer peripheral face of the sealing ring sealingly engages the axial inner wall of the recess.

4 Claims, 3 Drawing Figures

BEARING SEAL FOR ENDLESS TRACKS

BACKGROUND OF THE INVENTION

The invention relates to a seal for bearings supporting the pins of an endless track. The latter is formed of alternating first and second link sides articulated to one another at joints. Each joint includes a bushing affixed to the first link side and a pin inserted in the bushing and affixed to the second link side. The seal includes a sealing ring that is made of a resilient material which is positioned in an annular recess provided in the second link side and through which the pin end passes. The sealing ring is axially compressed and is supported at one radial side by a radial edge face of the bushing and engages with its other radial face the radial base of the annular recess in the second link side. The purpose of seals of this type is to serve as dust guards and to prevent losses of lubricant applied between the bearing and the pin.

Sealing rings of the above-outlined type are known and are described, for example, in U.S. Pat. No. 3,838,896 which discloses sealing rings of circular or quadratic cross section made of rubber or similar resilient material. As described in the above-mentioned patent, it is further known to use, as a sealing, two spring disc-like members made of metallic discs having ground sealing faces.

Apart from the fact that the contact faces of the bushing and the recess in the link side which cooperate with the metal discs have to be carefully machined to avoid lubricant losses, this type of arrangement does not prevent the penetration of soiling particles which may relatively rapidly damage the sealing faces, thus resulting in lubricant losses. Also, the penetration of soiling particles into the bearing further accelerates the wear of the parts.

SUMMARY OF THE INVENTION

It is an object of the invention to provide an improved seal of the above-outlined type which provides a better protection against lubricant losses and against the penetration of soiling particles.

This object and others, to become apparent as the specification progresses, are accomplished by the invention, according to which, briefly stated, the sealing ring has a concave profile at least at that radial side which is oriented towards the bushing and forms a closed annular chamber with the radial edge face of the bushing. Upon application of a thrust load, the sealing ring tightly engages, with its peripheral face, the inner axial wall of the recess provided in the second link side.

That edge of the sealing ring structured according to the invention which is oriented towards the edge face of the bushing renders the penetration of dust to the inner sealing faces (which prevent the lubricant loss) exceedingly difficult so that this measure along ensures a significantly longer operational safety of the seal than achieved heretofore. Further, not later than during axial compression of the sealing ring (caused by the thrust load), the above-noted annular chamber defined by the sealing ring and the radial edge face of the bushing, is filled with lubricant so that dust particles that were able to pass through the outer sealing zone are withheld by the lubricant-filled chamber from the inner sealing faces.

According to an advantageous development of the invention the sealing ring is of concave profile at both radial sides and thus forms separate closed chambers both with the edge face of the bushing and the radial base of the recess in the second link side. Further, in the radially outer and radially inner axial faces of the sealing ring, there are provided circumferential grooves for enhancing the spreading and engagement of the sealing ring in its axially compressed state. Also, additional chambers are thus formed which further improve the sealing of the bearing.

According to a further feature of the invention, which renders more difficult the penetration of dirt into the sealing zones, resides in the fact that the edge of the sealing ring which cooperates with the edge face of the bushing and which defines the radially outer perimeter of the concavity of the radial side of the sealing ring oriented towards the bushing, is, in the axially compressed state of the sealing ring, arranged in an at least approximately flush relationship with the axial outer face of the bushing.

According to a preferred embodiment of the invention the sealing ring has an annular, concentrically arranged peripheral collar which extends with a clearance between the end portion of the bushing and the axial inner wall of the recess that surrounds the end of the bushing. Upon axial compression of the sealing ring, the collar engages with its free circular edge the first link side which carries the bushing and with its outer cylindrical surface engages the inner axial wall of the recess in the second link side. In this manner the penetration of dirt into the recess is initially made difficult and thus a wear of the recesses in the zone surrounding the end portion of the bushing is practically prevented. Thus, it has become possible for the first time to merely replace the pins and the bushings in a stretched track to restore the original track length. Heretofore it has been necessary to replace the link sides as well, which were significantly weakened at the recesses.

DESCRIPTION OF THE PREFERRED EMBODIMENT

Figure 1:
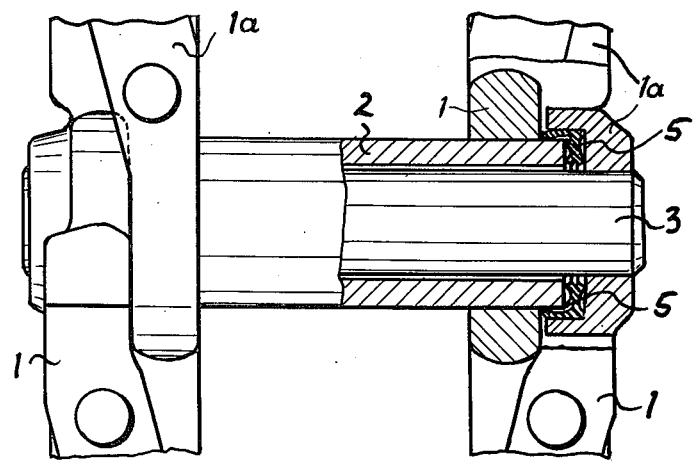
FIG. 1 is a plan view, partially in section, of a joint of an endless track.

Turning now to FIG. 1, the endless track (used, for example, for tractors) which incorporates the invention, comprises pairwise arranged link sides 1 and pairwise arranged link sides 1a alternating in the direction of track length. Each link side 1 is articulated to a link side 1a by a joint comprising a bushing 2 press-fitted into aligned bores of the link sides 1 of one link side pair and a pin 3 extending through the bushing 2 and press-fitted into aligned bores of the link sides 1a of an adjoining link side pair. Each link side pair is connected by a base plate (not shown).

The friction between a bore and the press-fitted bushing 2 or between a bore and the press-fitted pin 3 is of such a magnitude that these press fits, on the one hand, do not need additional securing means and, on the other hand, permit, when high operational stresses are generated, an intentional separation of the bushing 2 and the pin 3 from the link sides 1, and 1a, respectively.

At each end portion which receives the pin 3, the link sides 1a have a cavity-like recess 4 which is coaxial with the pin 3 and into which partially extends an outer terminal axial surface portion 2a of the bushing 2.

In the space defined by the recess 4 there is positioned a sealing ring 5 made of an elastic, lubricant-resistant, rubber-like synthetic material which, in a temperature range of approximately −60° C. to approximately 100° C. is at least approximately uniformly elastically deformable, that is, its modulus of elasticity is approximately constant in the given temperature range. For example, the use of Vullcolan ® or Desmopan ® as the material for the sealing ring 5 was found to be very satisfactory.

Figure 2:
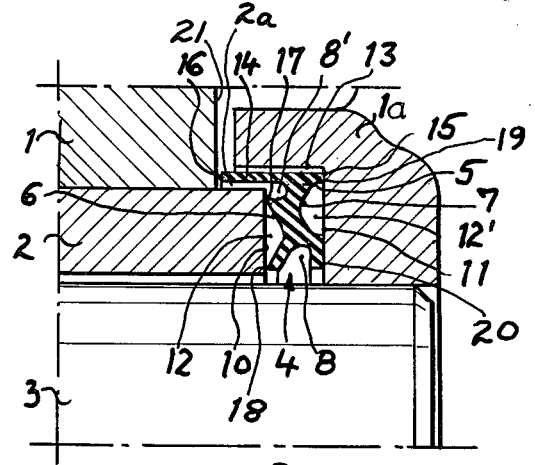
FIG. 2 is, on an enlarged scale, a sectional side elevational view of one part of FIG. 1, depicting the components in the absence of thrust load.
Figure 3:
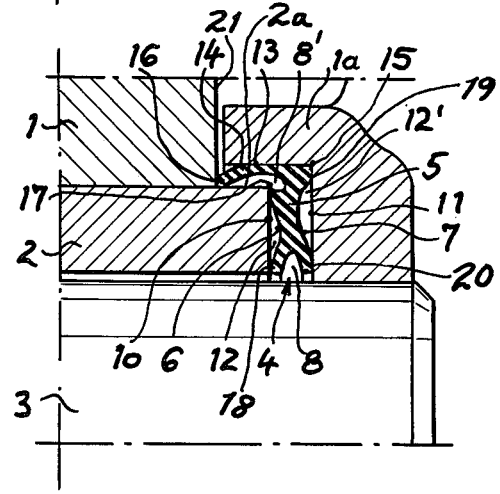
FIG. 3 is a view similar to FIG. 2, depicting the components during application of thrust load.

The two radial sides 6 and 7 of the sealing ring 5 are of concave profile. Further, at the inner and outer axial side the sealing ring 5 is provided with circumferential grooves 8, 8', respectively. In service, the sealing ring 5 is submitted to a thrust load (compression) by bringing the link sides 1, 1a from their position shown in FIG. 2 into their permanent position shown in FIG. 3. As seen in FIG. 3, the concave side 6 of the sealing ring 5 and the edge face 10 of the bushing 2 defines a closed chamber 12, whereas the concave side 7 of the sealing ring 5 and the base 11 of the recess 4 defines a closed chamber 12'. The chamber 12 is bounded by radially spaced sealing faces 17, 18 which form part of the sealing ring 5 on the one radial side thereof and which are pressed into engagement with the edge face 10 of the bushing 2. The chamber 12', in turn, is bounded by radially spaced sealing faces 19, 20 which form part of the sealing ring 5 on the other radial side thereof and which are pressed into engagement with the radial base 11.

By virtue of its particular shape, the sealing ring 5 expands in an advantageous manner and lies flat against the inner axial wall 13 of the recess 4.

Since prior to the assembly of the endless tracks the bearings for the pin are provided with lubricant, upon press-fitting th link sides 1a on the pin 3, lubricant will be displaced into at least the chamber 12. To enhance this occurrence, the sealing ring 5 is provided with an integral, peripheral collar 14 which, in the absence of thrust load, as it may be observed in FIG. 2, extends parallel to and spaced from the axial (cylindrical) outer face of the bushing 2 and the axial face 13 of the recess 4, into the annular chamber formed by the latter. Thus, the sealing ring 5 may be mounted with ease. Upon press-fitting the link sides 1a onto the pin 3, the collar 14 is also axially compressed. As a result, the outer edge 15 of the collar 14 oriented towards the base 11 of the recess 4 is pressed tightly into the corner of the recess 4, while the free 21 circular edge 16 of the collar 14 sealingly abuts an outer radial face of that portion of the link side 1 which supports the bushing 2. At the same time, the collar 14 bulges radially outwardly and lies flat against the axial wall surface 13 of the recess 4.

The sealing face 17 which defines the radially outer perimeter of the concave side 6 of the sealing ring 5, and which cooperates with the edge face 10 of the bushing 2 is positioned flush with the outer cylindrical face 22 of the bushing 2 when the sealing ring 5 is exposed to thrust load, as it may be seen in FIG. 3.

It will be understood that the above description of the present invention is susceptible to various modifications, changes and adaptations, and the same are intended to be comprehended within the meaning and range of equivalents of the appended claims.

What is claimed is:

1. A sealing ring made of a resilient material, comprising in combination:
    a. a first radial side having a concave annular face;
    b. a second, axially opposite radial side having a concave annular face;
    c. a radially inner axial face provided with a circumferential groove; and
    d. a collar having an outer cylindrical face defining the outer diameter of the sealing ring; said collar extending axially in the direction of orientation of said first radial side and having a free circular terminal edge projecting axially beyond said first radial side.

2. A sealing arrangement for endless tracks formed of alternating first and second link sides articulated to one another at joints; each joint including a bushing affixed to the first link side and a pin surrounded by the bushing and affixed to the second link side; a recess provided in the second link side and defined by a radial base and an inner axial wall of the second link side; the pin extending medially through the recess and the bushing extending, with an outer terminal axial surface portion and a radial face, into the cylindrical recess beyond a radial face of the first link side; the sealing arrangement including a resilient sealing ring received in the recess and surrounding the pin; the sealing ring having a first radial side oriented towards the radial edge face of the bushing, a second, opposite radial side oriented towards the radial base of the second link side, an inner axial side oriented towards the pin and an outer axial side oriented towards the inner axial wall of the second link side; the sealing ring being axially compressed by the radial edge face of the bushing and the radial base of the recess, whereby the first radial side of the sealing ring is in engagement with the radial edge face of the bushing and the second radial side of the sealing ring is in engagement with the radial base of the second link side; the improvement wherein said first radial side of said sealing ring has a first sealing face pressed into engagement with said radial edge of said bushing and a second sealing face pressed into engagement with said radial edge of said bushing; said first sealing face being radially spaced from said second sealing face; said first and second sealing faces define, with said radial edge face of said bushing, a first sealed chamber; said second radial side of said sealing ring having a third sealing face pressed into engagement with said radial base of said second link side and a fourth sealing face pressed into engagement with said radial base of said second link side; said third sealing face being radially spaced from said fourth sealing face; said third and fourth sealing faces define, with said radial base of said second link side, a second sealed chamber; said sealing ring further having a peripheral collar oriented towards said radial face of said first link side; said collar having a free end an outer axial face constituting said outer axial side of said sealing ring; said axial face of said collar being pressed into engagement with said inner axial wall of said second link side and said free end of said collar being pressed into engagement with said radial face of said first link side and said outer terminal surface portion of said bushing.

3. A sealing arrangement as defined in claim 2, wherein said inner axial side of said sealing ring is provided with a circumferential groove surrounding and directly adjoining said pin.

4. A sealing arrangement as defined in claim 2, wherein said second sealing face of said sealing ring is at least approximately flush with said outer terminal cylindrical surface portion of said bushing.

* * * * *